May 10, 1938.  F. L. BISHOP  2,116,693
MANUFACTURE OF SHEET GLASS
Filed Sept. 8, 1934　　2 Sheets-Sheet 2
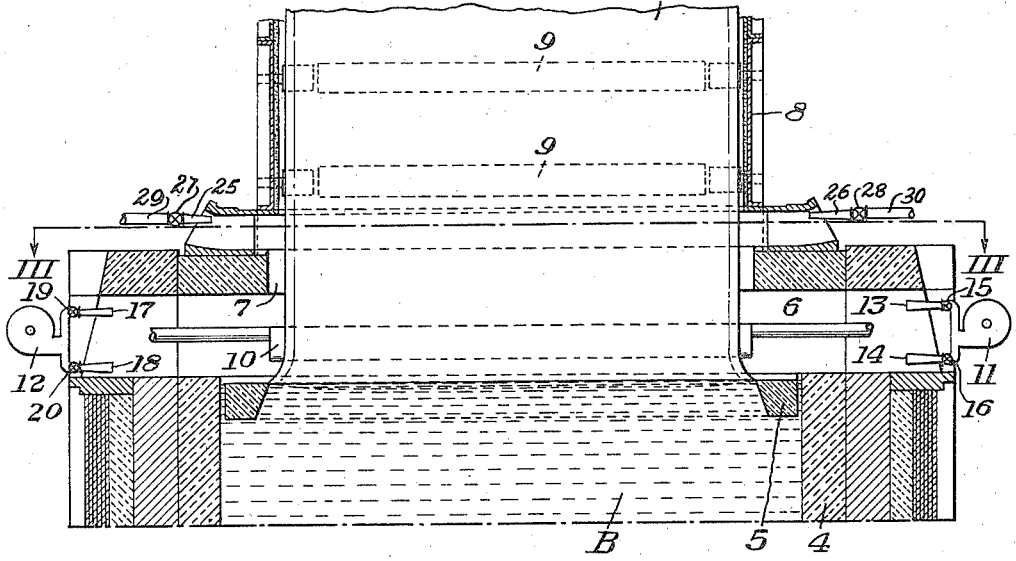
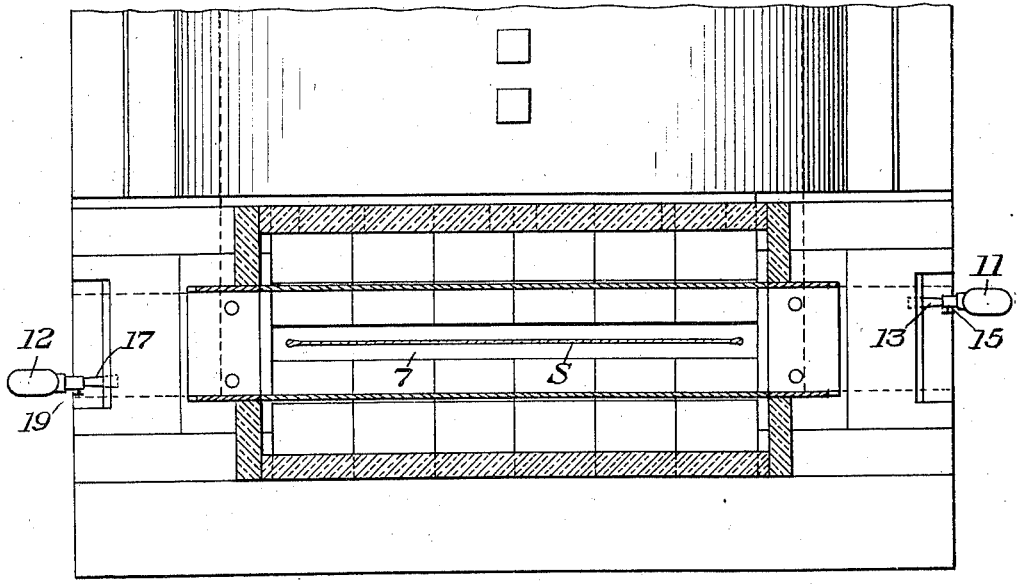
INVENTOR
Frederic L. Bishop
By Byrnes, Stebbins,
and Blenko
Attorneys Patented May 10, 1938

2,116,693

UNITED STATES PATENT OFFICE 2,116,693

MANUFACTURE OF SHEET GLASS

Frederic L. Bishop, Fox Chapel, Pa., assignor to American Window Glass Company, Pittsburgh, Pa., a corporation of Pennsylvania Application September 8, 1934, Serial No. 743,224

17 Claims. (Cl. 49—17)

The present invention relates broadly to the manufacture of sheet glass, and more particularly to the annealing thereof and the removal from the drawn glass sheet of at least a portion of the characteristic wave of drawn glass.

By my invention I provide an improved method of manufacturing sheet glass whereby the sheet may be properly annealed during the continuous drawing thereof in a vertically extending direction from a tank containing a bath of molten glass and whereby a substantial portion of the characteristic wave of drawn glass may be eliminated. The product resulting from my improved method of manufacture is superior to the products obtained by the presently known methods of drawing sheet glass, for example, the Fourcault process, by reason of the proper annealing thereof and the removal of the characteristic wave therefrom.

It is well known that in the Fourcault process a continuous sheet is drawn from a bath of molten glass and is passed vertically past coolers which set the sheet. The sheet then continues upwardly through the drawing pit and into and through a vertically extending leer, at the top of which the continuous sheet is cut off in lengths. Heretofore it has been deemed impossible to properly anneal the rising glass sheet. I have found that the difficulty arises from two factors, first, insufficient annealing, and second, lack of uniformity in annealing. This latter factor, which seems not to have been appreciated in the past, is highly important. It is unnecessary for most purposes to totally eliminate the strain from the glass, but it is desirable to eliminate a major portion thereof and substantially uniformly to distribute the remaining strain through the sheet. A certain amount of residual strain is desirable in certain cases because such glass is less likely to break under certain conditions than a perfectly annealed sheet. However, if the residual strain is not distributed by uniform annealing there is increased danger of breakage and also the likelihood that in cutting such a sheet the cut will run off line. Glass which is nonuniformly strained is particularly undesirable in sheets which are to be ground and polished, not only because of the danger of breakage, but also because the grinding and polishing is not likely to be uniform.

I have found that by circulating a gaseous medium in contact with and transversely of the moving glass sheet, while the temperature of the sheet is above the lower limit of the annealing range, the introduction of undue strain in the glass may be eliminated and the strain remaining in the sheet uniformly distributed. It is not necessary that the gaseous medium circulate exactly horizontally across the sheet. It is sufficient if it is circulated in a direction across the sheet having a horizontal component and this is the sense in which the word transversely is used herein. The annealing range is approximately 850° to 1100° F. Where my invention is practiced, the strain remaining in the sheet is of no moment as it does not detrimentally affect the character of the product.

The circulation of the gaseous medium may be effected in various different ways, some of which are specifically described and claimed in the copending application of William L. Monro, Serial No. 743,207, filed of even date herewith, now Patent No. 2,002,544. For example, highly desirable results may be obtained where the gaseous medium in the drawing pit or in the base of the leer adjacent the glass sheet is circulated transversely of the rising sheet. I have also found that the advantages of my invention may be obtained where blowers are utilized for blowing additional air into the drawing pit or the base of the leer and transversely of the sheet. An ordinary blower for blowing atmospheric air into the pit or leer may be used, as may a Venturi type blower for blowing fresh air and a portion of the gaseous medium already in the pit or leer transversely of the sheet. It is essential, however, that the gaseous medium in contact with the rising glass sheet be circulated transversely of the sheet. Advantageous annealing may be effected where this circulation is accomplished when the temperature of the sheet is above the annealing range, but I have found that the best results from the annealing standpoint can be obtained where the transverse circulation is effected where the glass is either within or adjacent the annealing range.

I have found that desirable results can be obtained where one or more blowers or fans for circulating the gaseous medium is utilized. Good results have been obtained with only a single blower or fan, but my observation indicates that it is preferable to provide at least two sources of supply, one located adjacent one edge of the sheet and adapted to cause circulation transversely across one face of the rising sheet, and the other means to be located adjacent the opposite edge of the rising glass sheet and arranged to cause circulation across the other face of the sheet. In this way a sheath of circulating gaseous medium about the glass sheet may be obtained.

It is well known that in the Fourcault process of drawing glass sheets the finished product has a characteristic wave extending longitudinally of the drawn sheet. I have found that by circulating the gaseous medium contacting the rising glass sheet transversely of the rising sheet and at a point or points where the temperature of the glass sheet is within or above the annealing range, this characteristic wave may be either totally eliminated or appreciably reduced. This is particularly advantageous in sheet glass for the product closely approximates the smooth surface characteristics of plate glass.

I have found that for purposes of removing the characteristic wave in sheet glass best results can be obtained where the transverse circulation is effected at a point where the temperature of the glass sheet is above the annealing range. This transverse circulation may be effected at the meniscus, in the range immediately above the meniscus, which may be termed the drawing range, in the setting range, or in the range between the annealing range and the setting range. I prefer to effect the transverse circulation of the gaseous medium a short distance above the meniscus and before the sheet has become set, although it will be understood that advantageous results from the standpoint of wave removal may be obtained where this transverse circulation is effected at any of the points above mentioned.

I have found that the transverse circulation of the gaseous medium adjacent the rising glass sheet while the sheet is within the setting range, the range just above the annealing range, or at or adjacent the meniscus not only reduces or eliminates waves but materially aids in effecting proper annealing of the glass sheet.

In the accompanying drawings, I have shown for purposes of illustration only apparatus which may be used in carrying out my invention. It will be understood that my invention is not limited to the particular apparatus shown in the drawings and that my invention may be readily practiced by various modifications thereof and by various other types of apparatus adapted to provide for transverse circulation of the gaseous medium contacting the rising glass sheet at a point or points where the temperature thereof is adjacent or above the lower limit of the annealing range, that is, adjacent or within the annealing range in the range immediately above the annealing range in the setting zone or at the meniscus.

In the drawings:

Figure 2 is a section taken along the line II—II of Figure 1; and

Figure 3 is a section taken along the line III—III of Figure 2.

Figure 1:
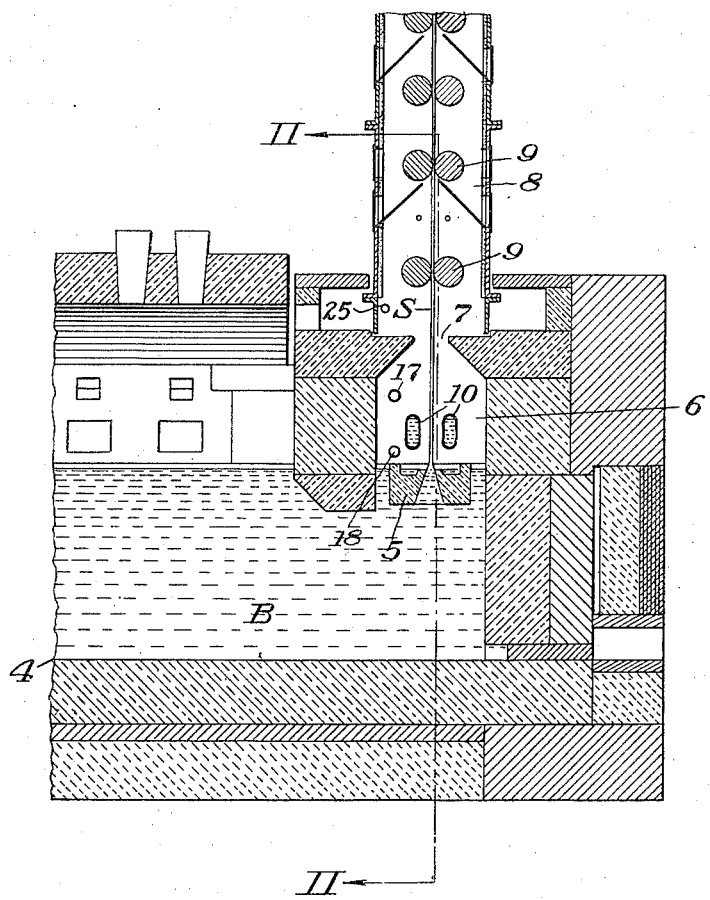
Figure 1 is a vertical sectional view through a glass drawing tank and a portion of the drawing apparatus.

The sheet S is drawn from a bath B in the tank 4 in the usual manner. As shown in the drawings, the sheet is drawn through a debiteuse 5 located in the pit 6 of the tank. It then passes upwardly through the mouth 7 of the tank and into the leer 8 where it is carried upwardly by means of a plurality of sets of rolls 9. Coolers 10 are provided adjacent the meniscus for cooling and setting the sheet as it is drawn upwardly through the slot in the debiteuse.

As the sheet moves upwardly it cools to and through the annealing range and then progressively drops in temperature until at the time it emerges from the top of the leer 8 it has a temperature of about 200° F.

In the preferred form of the invention a blower 11 supplies atmospheric air under pressure to the drawing pit. The blower is located to one side of the glass sheet so that it will cause transverse circulation of the gaseous medium adjacent the rising glass sheet. A similar blower 12 is provided at the diagonally opposite corner of the pit. The blowers, when positioned in this manner, effect an excellent transverse circulation of the gaseous medium around the sheet. Stray convection currents, causing local chilling, are thereby eliminated and a gaseous sheath, substantially uniform as to temperature or at least free of marked and sudden differences in temperature, is formed. As shown in Figure 1, the blowers or other gas circulating means in the pit are placed outside the coolers. This is found to give desirable results without any danger of crizzling the sheet by reason of cold air striking it.

The blower 11 is provided with two inlets 13 and 14 for injecting air into the pit. The supply of air through the inlet 13 may be controlled by a valve 15 and the supply through the inlet 14 may be controlled by a similar valve 16. The inlets 13 and 14 are, as shown in the drawings, spaced vertically so that air may be injected at vertically spaced points along the path of travel of the sheet.

The blower 12 is also provided with two vertically spaced inlet openings 17 and 18 for injecting air into the pit. The supply of air through these openings is controlled by valves 19 and 20. For circulating air transversely of the rising glass sheet in the base of the leer, pipes 25 and 26 are provided. The supply of air passing through the pipes 25 and 26 may be appropriately regulated by valves 26 and 28. Appropriate connections 29 and 30 are provided for connecting the pipes 25 and 26 to either the blowers 11 and 12 or other similar blowers.

The gaseous medium contacting the sheet may be circulated either in the pit or in the base of the leer. It is only essential that this movement of the contacting gaseous medium is placed about the sheet at a time when the temperature of the rising glass sheet is adjacent to, within or above the annealing range.

A Venturi type of blower may be used in place of the type of blower shown in the drawings. In the event this type of blower is used, some of the gas already within the pit or base of the leer will be entrained along with the additional gaseous medium injected into the pit or base of the leer by the blower.

It is unnecessary to inject any additional gaseous medium into the pit or the base of the leer, for satisfactory results may be obtained by locating fans or blowers within the pit or base of the leer in such manner as to cause the transverse circulation of the gaseous medium therein and adjacent the sheet.

Polariscope tests on the product resulting from the practice of my process show that the product is properly annealed and a substantial portion of the strain removed, and the balance remaining in the sheet is sufficiently uniformly distributed therethrough as to not detrimentally affect the character of the product. The product obtained in this manner can be readily cut without breakage occasioned by any strain which may be therein, and may be readily ground and polished without breakage resulting from strain. Furthermore, the product obtained from the practice of my process is substantially free of the characteristic wave of ordinary drawn glass sheets. The advantages of eliminating these characteristic waves will be readily apparent to those skilled in the art and need not be set forth herein.

While I have shown and described the preferred method of practicing my invention and an apparatus for carrying out the same, it will be understood that I do not intend to be limited thereby but that my invention may be otherwise practiced within the scope of the following claims.

I claim:

1. In the method of annealing a glass sheet during the continuous drawing thereof in a vertically extending direction from a bath of molten glass, the steps comprising forming the glass sheet, and, while the temperature of the sheet is substantially at the annealing range, circulating a gaseous medium in contact with and transversely of the moving sheet from one edge of the sheet toward the other edge thereof.

2. In the method of annealing a glass sheet during the continuous drawing thereof in a vertically extending direction from a bath of molten glass, the steps comprising forming the glass sheet, and, while the temperature of the sheet is above the lower limit of the annealing range, circulating a gaseous medium in contact with and transversely of the moving sheet from one edge of the sheet toward the other edge thereof.

3. In the method of forming a glass sheet by continuous drawing from a tank containing a bath of molten glass, the steps consisting in forming the sheet, and circulating a gaseous medium in contact with and transversely of the sheet from one edge of the sheet toward the other edge thereof while the temperature of the sheet is above the lower limit of the annealing range.

4. In the method of forming a glass sheet by continuous drawing from a tank containing a bath of molten glass, the steps consisting in forming the sheet and circulating a gaseous medium in contact with and transversely of the sheet from one edge of the sheet toward the other edge thereof while the temperature of the sheet is above the annealing range.

5. In the method of forming a glass sheet by continuous drawing from a tank containing a bath of molten glass, the steps consisting in forming the sheet, and circulating a gaseous medium in contact with and transversely of the sheet from one edge of the sheet toward the other edge thereof while the temperature of the sheet is substantially at the setting range.

6. In the method of forming a glass sheet by continuous drawing from a tank containing a bath of molten glass, the steps consisting in forming the sheet, and circulating a gaseous medium in contact with and transversely of the sheet from one edge of the sheet toward the other edge thereof while the temperature of the sheet is substantially at the setting range, and also while the temperature of the sheet is substantially at the annealing range.

7. In the method of forming a glass sheet by continuous drawing from a tank containing a bath of molten glass, the steps consisting in forming the sheet, and circulating a gaseous medium in contact with and transversely of the sheet substantially at the meniscus.

8. In the method of forming a glass sheet by continuous drawing from a tank containing a bath of molten glass, the steps consisting in forming the sheet, and circulating a gaseous medium in contact with and transversely of the sheet substantially at the meniscus and also while the temperature of the sheet is substantially at the annealing range.

9. In the method of annealing a glass sheet during the continuous drawing thereof from a tank containing a bath of molten glass and in a vertically extending direction through the drawing pit and a leer, the steps comprising forming the sheet, and circulating a gaseous medium in the base of the leer transversely of the rising sheet from one edge of the sheet toward the other edge thereof.

10. In the method of annealing a glass sheet during the continuous drawing thereof from a tank of molten glass and in a vertically extending direction through the drawing pit and a leer, the steps comprising forming the sheet, circulating a gaseous medium in the pit transversely of the sheet and circulating a gaseous medium in the base of the leer transversely of the rising sheet from one edge of the sheet toward the other edge thereof.

11. In the method of annealing a glass sheet during the continuous drawing thereof from a tank containing a bath of molten glass and in a vertically extending direction through the drawing pit and a leer, the steps comprising forming the sheet, and, while the temperature of the sheet is substantially at the annealing range, circulating a gaseous medium transversely of the sheet in such manner as to form substantially a sheath of said circulating gaseous medium around the rising sheet, and thereafter permitting the sheet to cool.

12. Apparatus for drawing sheet glass comprising a slotted member, means to draw molten glass upward from said slot, a cooler spaced above said member, parallel with and at one side of said slot, and means to create a current of gas substantially parallel with said slot and between said member and said cooler.

13. Apparatus for drawing sheet glass comprising a glass furnace extension, a slotted member at the surface of the glass in said extension, means to draw glass upward from said slot, a cooler spaced above said slotted member and adjacent to and parallel with each face of the drawn glass, and means to create a substantially horizontal current of gas along the space between each cooler and the slotted member and substantially parallel with said slot.

14. In the method of forming a glass sheet by continuous drawing from a tank containing a bath of molten glass and in a vertically extending direction through the drawing pit, the steps comprising forming the sheet, and circulating a gaseous medium in the pit transversely of the sheet.

15. The process of drawing glass, which consists in drawing glass upward from a suitable source of molten glass, stretching the glass, as it is drawn upward, to a sheet of suitable thickness, while contacting the surfaces of the sheet with gases, cooling the glass during said drawing and thereby terminating the stetching of the glass, and producing currents in the gases adjacent to and substantially parallel with the line of said source, whereby gases must cross said current to reach the surface of the glass being drawn.

16. Apparatus for drawing sheet glass comprising means for providing a pool of molten glass, a slotted member at the surface of the glass, means to draw a sheet of glass upward from said slot, and means to produce a current of gas flowing horizontally along each side of the drawn glass immediately above said slotted member.

17. The process of drawing sheet glass, which consists in drawing a sheet upward from a source of molten glass, stretching and cooling the sheet while surrounding it with gases, and producing a current of said gases adjacent to and parallel with said source on at least one side thereof, whereby gases cross said current to reach the surface of the glass during its stretching.

FREDERIC L. BISHOP.